PUNCH CARD READER

Filed Feb. 28, 1966 3 Sheets-Sheet 1

INVENTORS
GENZO ISOBE
TOMOMASA TANAKA
TADAO HONDA
BY Stanley Wolder
ATTORNEY

INVENTORS
GENZO ISOBE
TOMOMASA TANAKA
BY TADAO HONDA
Stanley Wolder
ATTORNEY

PUNCH CARD READER

Filed Feb. 28, 1966 3 Sheets-Sheet 3

INVENTORS
GENZO ISOBE
TOMOMASA TANAKA
TADAO HONDA
BY Stanley Wolder
ATTORNEY 3,529,132
PUNCH CARD READER

Genzo Isobe, Tomomasa Tanaka, and Tadao Honda, Tokyo-to, Japan, assignors to Tanaka Seiki Kabushiki Kaisha, Tokyo-to, Japan, a corporation of Japan Filed Feb. 28, 1966, Ser. No. 530,655
Claims priority, application Japan, Apr. 20, 1965, 40/22,933
Int. Cl. G06k *7/00;* B07c *5/342*
U.S. Cl. 235—61.11 8 Claims

ABSTRACT OF THE DISCLOSURE

A punched card hole sensing network includes a first photocell exposable to light through a punch hole coded area and second and third photocells exposed to light flashes when the coded area registers with the first photocell. The second and third photocells control second and third solid state switches which control a classifying solenoid and the first photocell controls a first solid state switch whose output is switch connected to alternatively control the enabling of the second and third solid state switches so as to selectively alternatively energize or deenergize the solenoid with the presence or absence of a hole in the sensed area. A plurality of the basic networks are associated to sense predetermined hole arrangements.

The present invention relates generally to improvements in sensing and classifying apparatus and it relates paritcularly to an improved apparatus for the sensing and selection of punched cards.

The use of punched cards for the storage and retrieving of information is widely practiced both commerically and industrially, the information carrying cards containing punched areas which classifying and identify the respective cards. Various types of apparatus and systems have been employed and proposed for automatically sorting the cards into one or more selected groups in accordance with the punched information carried thereby, but because of the accuracy required of such equipment they have employed bulky and complicated electrical networks, frequently lacking in reliability and adversely subject to varying atmospheric and ambient conditions.

In the systems of the above type, an important requirement is absence of mis-selection, A mis-selection may be partly caused by a defective electrical component forming part of the complicated electronic circuit, or by a change of temperature or humidity resulting in change of values of various constants of the electronic circuit. Such causes, however, may be avoided by the proper maintenance procedure of the system before any accident occurs, and if mis-selection occurs the cause can be readily detected.

In addition, a mis-selection can also occur because of imperfect operation or contact of switches in the arrangement. In such case an occurrence of mis-selections is not regular and accordingly it is difficult to detect the cause and to entirely prevent such accident. Few mis-selections due to imperfect contact are caused by those switches which do not operate during a card selecting operation. Such mis-selections due to imperfect contact of those switches which operate during card selecting operation are, however, caused with great frequency. If it is assumed that no imperfect contact mis-selection is caused by switches operating during card selecting operation, the probability of occurrence of mis-selection would be very small. Accordingly, an arrangement with no imperfect contact accident during card selecting operation would operate in a highly accurate manner.

Therefore, a principal object of the present invention is to provide an improved punch card hole detecting arrangement which is to be used in a punch card selecting apparatus and which eliminates imperfect switch contact so as to prevent mis-selection.

Another object of the present invention is to provide an improved punch card hole detecting arrangement wherein the punch hole operated circuit is bias-controlled so that mis-selection is electrically prevented.

Still another object of the present invention is to provide an improved punch card hole detecting arrangement network characterized by its simplicity, reliability, compactness and low cost.

The above and other objects of the present invention will be clear from a reading of the following description with respect to embodiments of the present invention as shown in the attached drawings, in which.

Figure 1:
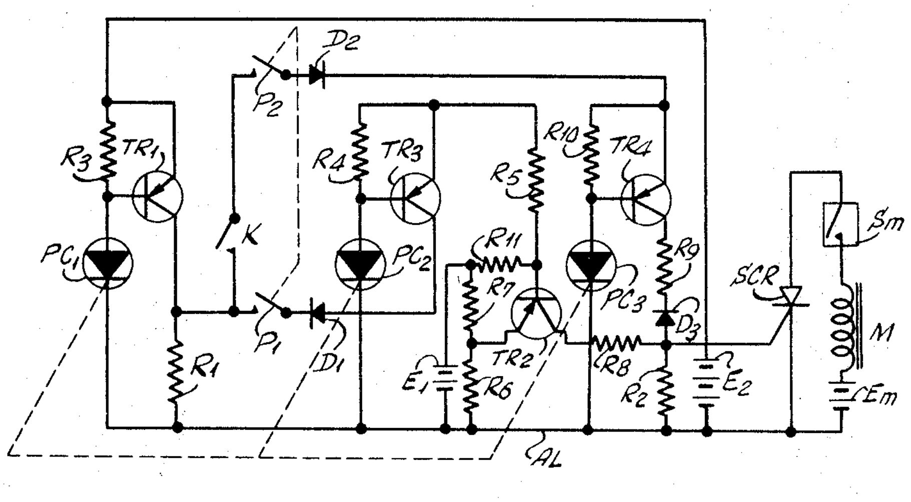
FIG. 1 is a basic circuit diagram of one embodiment of the present invention.

Referring now to FIG. 1, a photosensitive element such as a photocell $PC_1$ is so positioned in any conventional manner in relation to a light source (not shown) that it is illuminated by the light passing through the punched hole of the card. Between the base and the collector of a switching transistor $TR_1$ there are connected the photocell $PC_1$ and a resistor $R_1$ in series with each other, and between the base and the emitter of the transistor $TR_1$ there is connected a bias resistor $R_3$. A power source $E_2$ is connected between the junction of the photocell $PC_1$ and the resistor $R_1$ and the emitter of the transistor $TR_1$. When the punched hole of the card passes between the photocell $PC_1$ and the light source (not shown), the photocell $PC_1$ generates or effects the flow of a photocurrent, which makes the emitter-cellector circuit of the transistor $TR_1$ conductive and a circuit with the power source $E_2$ is established through the return line AL.

A photocell $PC_2$ is positioned adjacent to a light source (not shown) which produces light pulses or flashes in synchronization with punched hole detecting moments, that is when a card punch hole receiving area registers with the photocell $PC_1$. One terminal of the photocell $PC_2$ is connected to the return AL and the other terminal is connected to the base of a transistor $TR_3$, which, like the transistor $TR_1$, performs a switching operation due to the photocurrent of the photocell $PC_2$. The collector of the transistor $TR_3$ is connected to the collector of the transistor $TR_1$ through a diode $D_1$ and a selector switch $P_1$ in series connection with each other. Between the base and the emitter of the transistor $TR_3$ there is connected a resistor $R_4$, and between the emitter and the return AL there are connected in series a resistor $R_5$, a resistor $R_{11}$ and a power source $E_1$.

Resistors $R_6$ and $R_7$ in series connection with each other are connected in parallel with the power $E_1$, and the junction of the resistors $R_6$ and $R_7$ is connected to the emitter of the transistor $TR_2$. The base of the transistor $TR_2$ is connected to the plus side of the power source $E_1$ through the resistor $R_{11}$, and the collector is connected to the gate terminal of a silicon controlled rectifier SCR through a resistor $R_8$.

A photocell $PC_3$ is, like the photocell $PC_2$, positioned adjacent to a light source (not shown) which issues light flashes in synchronization with punched hole detecting moments. One terminal of the photocell $PC_3$ is connected to the return AL and the other terminal is connected to the base of the transistor $TR_4$. The collector of the transistor $TR_4$ is connected to the gate terminal of the silicon controlled rectifier element SCR through a resistor $R_9$ and a voltage regulator diode $D_3$ connected in series; the emitter of the transistor $TR_4$ is connected to the collector of the transistor $TR_1$ through a diode $D_2$, a selector switch $P_2$ and another selector switch K in series connection; and between the base and the emitter of the transistor $TR_4$ there is connected a resistor $R_{10}$. The cathode terminal of the silicon controlled rectifier element SCR is connected to the return AL, and the anode terminal thereof is connected to the return AL through a microswitch $S_m$ which is operated in synchronization with passage of a punch card, a card sorting or classifying electromagnet M and a power source $E_m$. Thus, an operative circuit is established wherein the electromagnet M is operated due to the control current from the transistor $TR_2$ and applied to the gate terminal of the silicon controlled rectifier element SCR. The selective switches $P_1$ and $P_2$ operate alternately with each other, that is, when the switch $P_1$ is open the switch $P_2$ is closed and vice versa; and these switches are plug switches.

Figure 2:
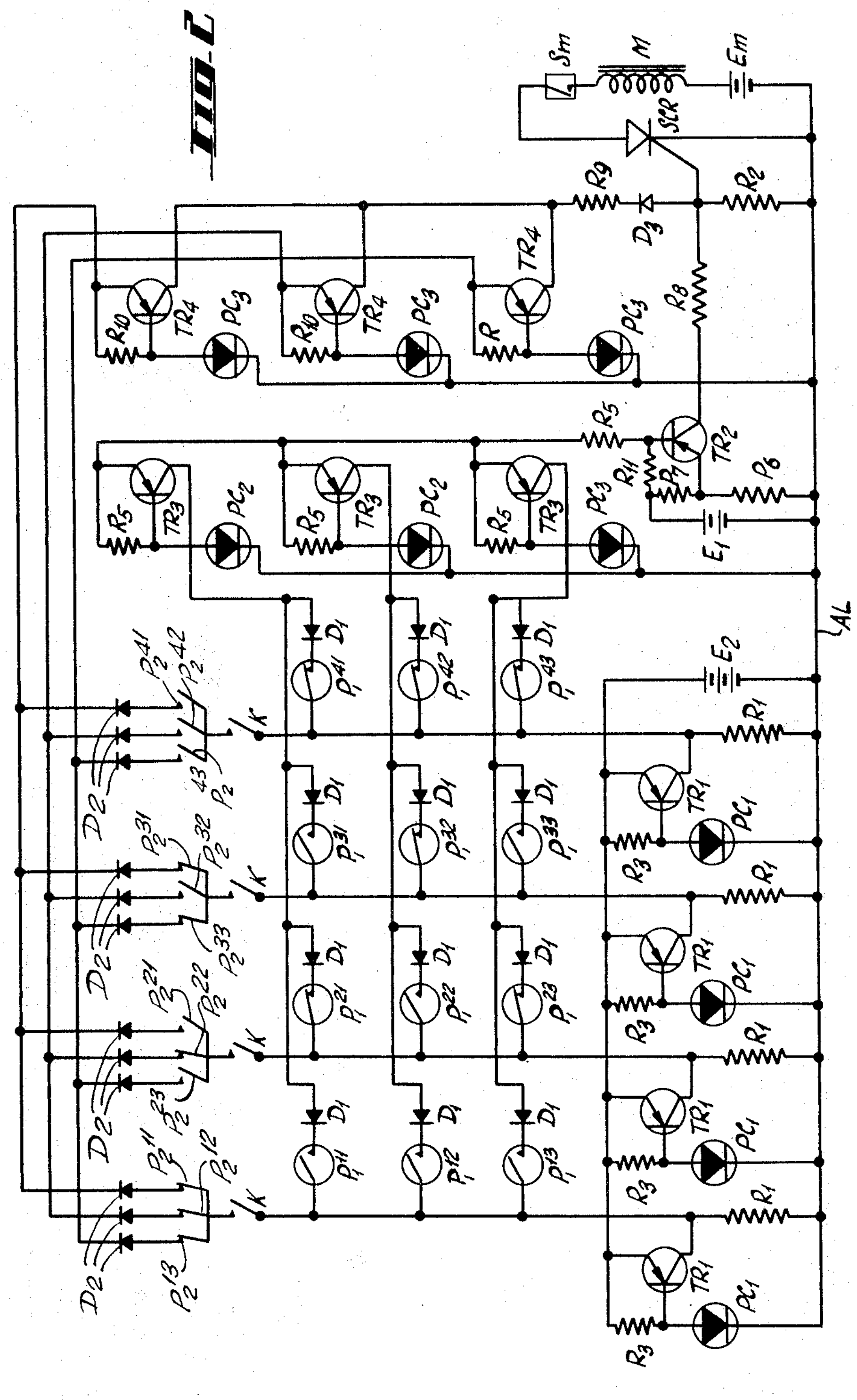
FIG. 2 is a circuit diagram of one embodiment of the present invention in which the basic circuit of FIG. 1 is employed.

The circuit as shown in FIG. 2 is intended for selection of cards provided with 4-row 3-column punch hole areas, and comprises a combination of the basic circuits as shown in FIG. 1. Accordingly, the same or similar symbol is used for each element of a corresponding function. Selector switches $P_1^{11}$, $P_1^{12}$ . . . $P_1^{43}$ of the same number as the punch hole areas are connected in parallel with each other, in respective circuits in the manner shown, thus corresponding to $m$ rows and $n$ columns. Corresponding to such selector switches $P_1^{ij}$ ($i=1, 2 \ldots m$; $j=1, 2 \ldots n$), selector switches $P_2^{ij}$ are also provided in parallel with each other in respective circuits in the manner shown.

Under the circuit control to be described later, each combination of the selective switches $P_1^{ij}$ and $P_2^{ij}$ constitutes separately a basic circuit as shown in FIG. 1. Detecting networks comprising a photocell $PC_1$ and a transistor $TR_1$ are connected in a row, and in columns there are connected switch devices comprising the photocell $PC_2$ operating in synchronization with the punched hole detecting moment and the transistor $TR_3$ and also switch devices comprising the photocell $PC_3$ and the transistor $TR_4$. A selector switch K is arranged between each $P_1^{ij}$ column and each selective switch $P_2^{ij}$ and is separately and manually operated.

Figure 3:
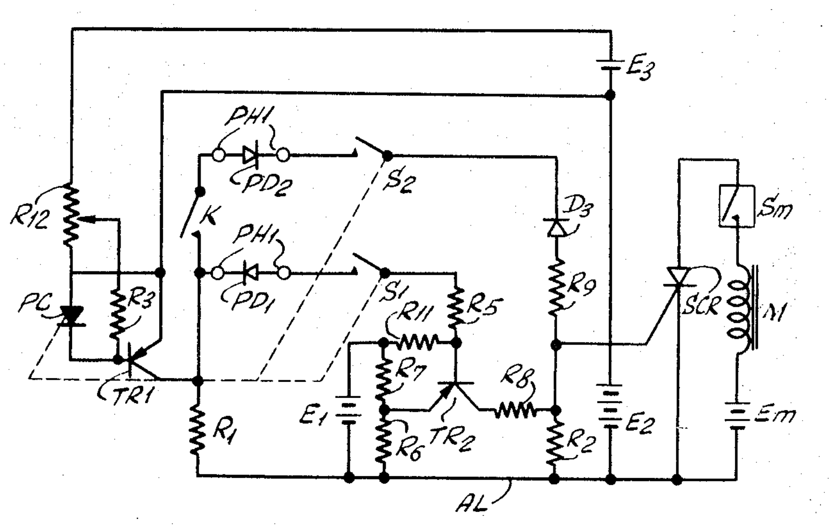
FIG. 3 is a basic circuit diagram of another embodiment of the present invention.

The circuit as shown in FIG. 3 is fundamentally similar to that shown in FIG. 1 so that any element having the same function is indicated by the same symbol and the description thereof is not repeated. A photocell PC corresponds to the aforementioned photocell $PC_1$ and a light source (not shown) is placed adjacent thereto the punched cards traveling between the photocell PC and the light source. The photocell PC is connected between the base and the emitter of a switching transistor $TR_1$ and renders transistor $TR_1$ conductive in the presence of photocurrent. To the base of the transistor $TR_1$ there is applied a bias voltage, derived power sources $E_2$ and $E_3$ in series connection, through a potentiometer or variable resistor $R_{12}$ and a resistor $R_3$.

When the punched hole of the card is brought to the position between the photocell PC and the light source (not shown) the photocell generates a photocurrent which makes the emitter-collector circuit of the transistor $TR_1$ conductive, and establishes a circuit with the return line AL and having the power Source $E_2$.

Mutually coupled mechanical switches $S_1$ and $S_2$ functionally correspond to the switch means of FIG. 1 respectively comprising the photocell $PC_2$ and the transistor $TR_3$ and the photocell $PC_3$ and the transistor $TR_4$, and are operated in synchronization with the punched hole detecting moments in any suitable manner. The switch $S_1$ is connected between the collector of the transistor $TR_1$ and the base of the transistor $TR_2$ through a pin diode $PD_1$ and a resistor $R_5$. The switch $S_2$ is connected between the collector of the transistor $TR_1$ and the gate electrode of a silicon controlled rectifier element SCR through a selective switch K, a pin diode $PD_2$, a voltage regulator diode $D_3$ and a resistor $R_9$ connected in series.

Pin diodes $PD_1$ and $PD_2$ respectively have a function combining those of the selector switch $P_1$ and the diode $D_1$ and of the selector switch $P_2$ and the diode $D_2$ of FIG. 1; and of plug switch structure, having a diode incorporated therein. The selector switch K is also a plug switch. Pin holes $PH_1$ and $PH_2$ are provided into which the pin diodes $PD_1$ and $PD_2$ are inserted to complete the circuit.

Figure 4:
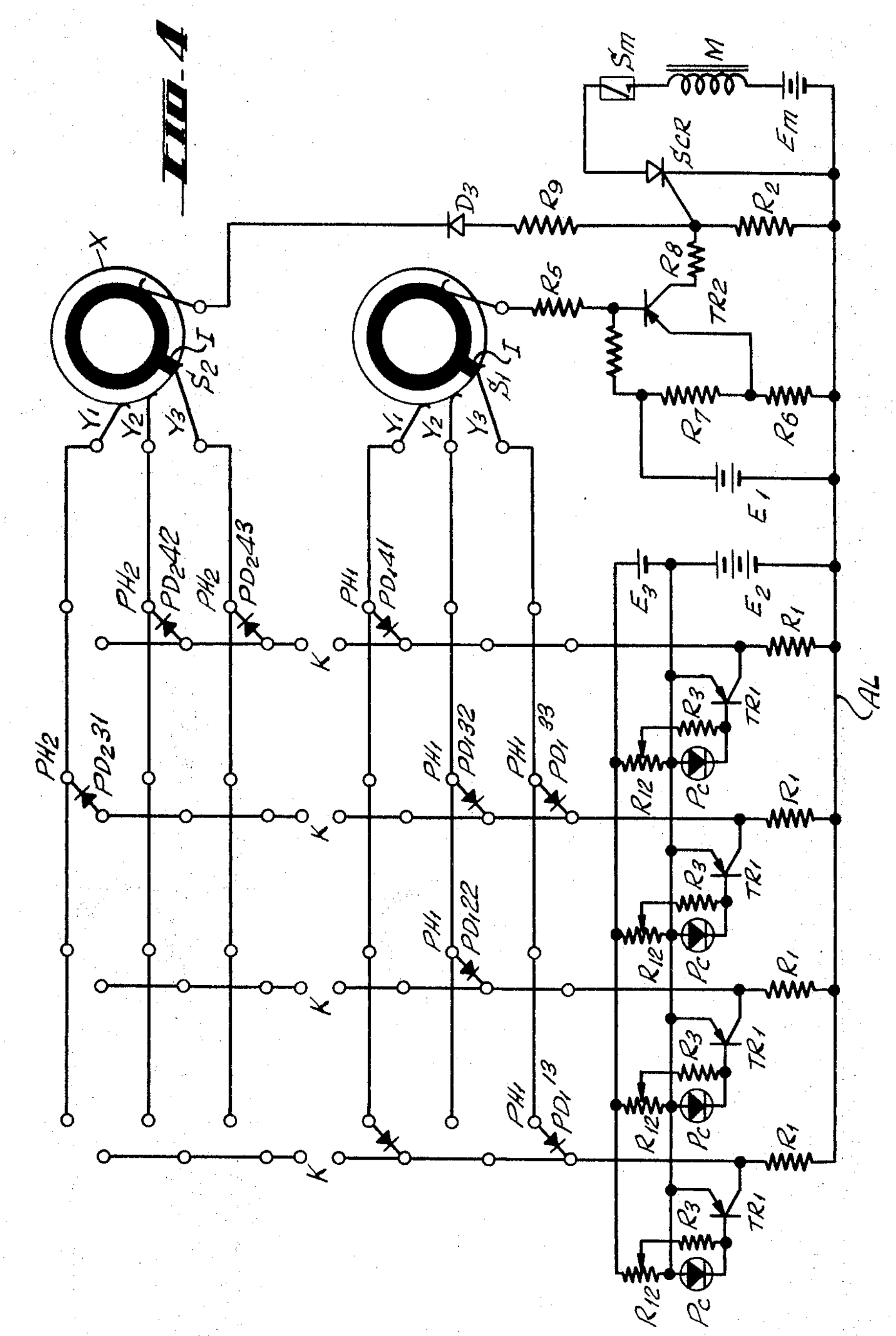
FIG. 4 is a circuit diagram of one embodiment of the present invention in which the basic circuit of FIG. 3 is employed.

The circuit as shown in FIG. 4 is fundamentally similar to that shown in FIG. 2 and is intended for selection of cards having 4-row 3-column punch hole areas. This circuit is constituted by a combination of the basic circuits shown in FIG. 3, and elements of the same function are indicated by the same or similar symbols. Pin holes of the number corresponding to that of the punched holes, $PH_1^{11}$, $PH_1^{12}$ . . . $PH_1^{43}$, are arranged in $m$ rows and $n$ columns, each pin hole being indicated by $PH_1^{ij}$ ($i=1, 2 \ldots m$; $j=1, 2 \ldots n$). In a similar manner, pin holes $PH_2^{ij}$ are arranged in $m$ rows and $n$ columns corresponding respectively to $PH_1^{ij}$.

In accordance with the circuit control to be described later, insertion of pin diodes $PD_1$ and $PD_2$ respectively into pin holes $P_1^{ij}$ and $P_2^{ij}$ establishes the basic circuits as shown in FIG. 3. Punched hole detecting networks each of which comprises a photocell PC and a transistor $TR_1$ are circuit connected in a row, and switches $S_1$ and $S_2$ which operate in synchronization with the punched hole detecting moments are circuit connected in a column. A pin hole $PH_3$ for a selective switch K is provided between each $PH_1$ column and corresponding $PH_2$ column. Switches $S_1$ and $S_2$ are of the rotary type with a rotor having a commutator or conductive portion I at one particular position of the periphery thereof. There are provided two sets of brushes $Y_1$, $Y_2$, $Y_3$, each of which is connected to each $PH_1$ and $PH_2$ row, and each set engages a respective rotor X so that as the rotor X rotates the conductive portion I is brought successively into contact with the brushes $Y_1$, $Y_2$, $Y_3$ and closes the corresponding circuit.

Generally, the selection of punch cards are divided into two types: Selection of the first type is to sort out cards of a specific classification, namely, cards having punched holes corresponding to particular classification; and selection of the second type is to sort out cards that have no particular classification, namely cards that have no punched holes at the positions corresponding to such specific classification.

The arrangement according to the present invention can effect selections of first and second types in a simple manner, and the operation of the arrangement is as follows:

Referring to the basic circuit diagram of FIG. 1, when selection of first type is to be effected, first the selector switch $P_1$ corresponding to the particular classification is closed and the corresponding selector switch $P_2$ is left open. Another selector switch K may be either closed or opened. The photocell $PC_1$ receives the light rays from the oppositely positioned light source (not shown) and generates a photocurrent. This condition is maintained until the forward end portion of the advancing punch card covers the photocell $PC_1$. During this interval due to the photocurrent generated by the photocell $PC_1$ the emitter-collector circuit of the transistor $TR_1$ is conductive so that a circuit is established comprising the voltage source $E_2$, the transistor $TR_1$ and the resistor $R_1$; and the voltage of the voltage source $E_2$ is applied, as a reverse bias and through the selective switch $P_1$, to the diode $D_1$ connected to the collector of the transistor $TR_3$. In this condition the microswitch $S_m$ arranged in the operational circuit of the electromagnet M remains open so that the electromagnet M remains inoperative without effecting any selective operation.

When the punch card advances into a position between the photocell $PC_1$ and the light source (not shown), the microswitch $S_m$ is closed and the photocell $PC_1$ stops generating photocurrent. This renders the emitter-collector circuit of the transistor $TR_1$ non-conductive so that the reverse bias applied to the diode $D_1$ is eliminated. Accordingly, if the photocell $PC_2$ generates photocurrent, the emitter-collector circuit of the transistor $TR_3$ becomes conductive so that the base potential of the transistor $TR_2$, which has been in "cut off" state, is lowered, making the transistor $TR_2$ operative; and thus a triggering voltage is applied to the gate of the silicon controlled rertifier element SCR making same conductive so that the circuit containing the electromagnet M is closed and the electromagnet M is actuated. However, the device is so arranged that under these circumstances the photocell $PC_2$ receives no light rays and accordingly no photocurrent is generated and the electromagnet M is not actuated.

The apparatus is so arranged that each of the photocells $PC_2$ and $PC_3$ receives a pulse light flash in synchronization with arrival of the card at such position that the card portion where the hole is to be punched, that is a punch area, comes between the photocell $PC_1$ and the light source (not shown). Accordingly, the presence or absence of a punched hole at this card punch area causes the following two phenomena respectively:

If there is a punched hole, the photocell $PC_1$ again receives light rays from the light source (not shown) so that a circuit containing the voltage source $E_2$, the transistor $TR_1$ and the resistor $R_1$ in series connection is closed. Therefore, a reverse bias is applied to the diode $D_1$ to make it non-conductive, so that the photocurrent generated by the photocell $PC_2$ due to the pulse flash does not make the emitter-collector circuit of the transistor $TR_3$ conductive. Accordingly, the transistor $TR_2$ is kept in a "cut off" state and the electromagnet M is not actuated so that no selective indication is made. If the system is so arranged that the absence of such indication will bring the card to a particular outlet, the card having the particular classification punched hole is obtained at such outlet.

On the other hand, if there is no punched hole, the photocell $PC_1$ does not generate photocurrent so that the emitter-collector circuit of the transistor $TR_1$ becomes non-conductive. This eliminates the reverse bias on the diode $D_1$ so that the emitter-collector circuit of the transistor $TR_3$ is rendered conductive and the transistor $TR_2$ becomes operative. Due to the operation of the transistor $TR_2$ a triggering voltage is applied to the gate of the silicon controlled rectifier element SCR to render it conductive. As a result the electromagnet M is actuated due to current from the voltage source $E_m$ and effects the sequence that the card be brought to the non-selective outlet.

When selection of second kind is to be made, the operation of the arrangement is as follows:

First selective instructions are given to the arrangement by closing the selective switches $P_2$ and K corresponding to the classification for the selection and opening the selector switch $P_1$. The operation of the other elements are performed in a manner similar to the aforementioned. Until the card is brought into the sensing area, due to the photocurrent generated by the photocell $PC_1$ an operative circuit is closed comprising the voltage source $E_2$, the transistor $TR_1$ and the resistor $R_1$ so that the voltage of the voltage source $E_2$ is applied to the emitter and the base of the transistor $TR_4$ through the selector switches K and $P_2$ and the diode $D_2$. Since, at this time, the photocell $PC_3$ receives no pulse flash it generates no photocurrent so that the transistor $TR_4$ is inoperative. Therefore, a voltage necessary for making the silicon controlled rectifier element SCR conductive is not established across the resistor $R_2$ connected between the return line AL and the gate of the silicon controlled rectifier element SCR; and further the microswitch $S_m$ remains open. As result the electromagnet M remains inoperative.

When the card is brought between the photocell $PC_1$ and the light source (not shown), the microswitch $S_m$ is closed, as aforesaid, and the photocell $PC_1$ is shielded from the light rays so that it generates no photocurrent. As a result the operative circuit containing the voltage source $E_2$, the transistor $TR_1$ and the resistor $R_1$ is opened so that no voltage is applied to the emitter and the base of the transistor $TR_4$, and no current flows through the emitter-collector circuit of the transistor $TR_4$. Accordingly, the silicon controlled rectifier element SCR remains non-conductive and the electromagnet M is not actuated.

When further advance of the card brings the card portion that is to be punched into registration with the position of the photocell $PC_1$, a synchronous pulse flash is given to each of photocells $PC_2$ and $PC_3$. Then, depending upon presence or absence of the punched hole in the registering area the operation of the arrangement is as follows:

When the card has no punched hole, the photocell $PC_1$ does not generate photocurrent so that the operative circuit having the voltage source $E_2$, the transistor $TR_1$ and the resistor $R_1$ remains open. Accordingly, no voltage is applied to the emitter and the collector of the transistor $TR_4$, so that the transistor $TR_4$ is not operative and accordingly no triggering voltage is applied to the gate of the silicon controlled rectifier element SCR to make it conductive. As a result, the electromagnet M is not actuated and the card is brought to the selective outlet, as mentioned before.

When the card has a punched hole, the photocell $PC_1$ generates photocurrent so that the operative circuit containing the voltage source $E_2$, the transistor $TR_1$ and the resistor $R_1$ is closed. As a result, the + potential of the voltage source $E_2$ is applied to the emitter and the base of the transistor $TR_4$. Further, the photocell $PC_3$ also generates photocurrent to make the transistor $TR_4$ operative, so that an operative voltage is applied to the gate of the silicon controlled rectifier element SCR to make it conductive. Thus, an operative current due to the voltage source $E_m$ is supplied to the electromagnet M which in turn provides an indication that the card be brought to the non-selective outlet.

Referring now to the circuit as shown in FIG. 2 wherein a plurality of the basic circuits for detecting a single punched hole are combined into multi-row and multi-column arrangement, each single circuit operates in the same manner as said basic circuit, and by suitably operating the selector switches $P_1$ and $P_2$ a card selection can be performed in accordance with the presence or absence of punched holes at the selected punch areas of the card.

In this embodiment, the selector switch K performs a special function. The aforementioned selections of the first and second types are performed with the switch K closed. Now, let us define the selection of third kind as the selection according to one particular condition but irrespective of any other condition. This selection of third kind can be performed by opening the selector switch K independent of other selector switches $P_1$ and $P_2$. As is apparent from the selections of first and second kinds of the function of the basic circuit, this operation of opening the selector switch K signifies exclusion of those conditions which are inconsistent with the desired particular condition.

While a 4-row 3-column arrangement example has been described above, it should be understood that any multi-row multi-column arrangement may function in the entirely same manner.

The structure and function of the embodiments as shown in FIGS. 3 and 4 are fundamentally the same as those of the embodiments as shown in FIGS. 1 and 2, the feature of the former which constitutes the principal difference from the latter being the use of mechanical switches $S_1$ and $S_2$ in place of the light actuated switches including photocells $PC_2$ and $PC_3$ and transistors $TR_3$ and $TR_4$.

Insertion of the pin diodes $PD_1$ and $PD_2$ respectively into the pin holes $PH_1$ and $PH_2$ corresponds to closure of the selector switches $P_1$ and $P_2$ respectively.

Thus, according to the present invention a practical great advantage can be obtained as follows: indication for the selection of cards is made by controlling the bias at the diode connected to the operative circuit which functions in response to the presence or absence of the punched hole, and the switch means is not of mechanical contact system but of photoelectric system. Therefore the present invention has entirely eliminated the imperfect contact of switch means which has heretofore been the great cause of mis-selection of cards. Thus a reliable accurate operation is achieved and further the simple circuit arrangement makes it possible to produce a simple and compact device at low cost.

While there have been described and illustrated preferred embodiments of the present invention it is apparent that numerous alterations, omissions and additions may be made without departing from the spirit thereof.

We claim:

1. In an apparatus for classifying punched cards comprising a hole detecting photosensitive element adapted to be positioned in the path of the punch areas of said cards and adapted to be exposed to light passing through holes formed in selected of said punched areas, an electrically controlled classifying device, a network responsive to said hole detecting photosensitive element and controlling said classifying device, the improvement wherein said network comprises a switch means alternatively actuatable to first and second states respectively and enabling and disabling said control network and normally being in one of said states and being actuated to the other of said states synchronously with the registry of said hole detecting photosensitive element with a punch area of said card, said control network comprising a diode connected in series with said switch means, means for applying a bias across said diode in response to the light incident on said hole detecting photosensitive element, a gate controlled rectifier coupled to said classifying device, and means for applying a triggering signal to said rectifier gate in response to the bias across said diode and the state of said switch means.

2. The apparatus of claim 1, wherein said switch means comprises a second photosensitive element exposed to light in synchronism with the registry of said card punch areas with said hole detecting photosensitive element, the states of said switch means being responsive to the light incident on said second photosensitive element.

3. The apparatus of claim 1, wherein said switch means comprises a transistor, and a second photosensitive element coupled to the base of said transistor and exposed to light in synchronism with the registry of said card punch areas with said hole detecting photosensitive element, the states of said switch means being responsive to the light incident on said second photosensitive element.

4. The apparatus of claim 1, wherein said switch means comprises a mechanical switch actuated concurrently with the advance of said punched card and in synchronism with the registry of said card punch areas with said hole detecting photosensitive element.

5. The apparatus of claim 1, including a pair of first and second of said diodes and a pair of first and second of said switch means said diodes being selectively alternatively connected in series with a corresponding switch means and said triggering signal applying means being responsive to the bias across the diode and the state of the switch means selectively series connected thereto.

6. The apparatus of claim 1, wherein said classifying device comprises a voltage source, a normally open card sensing switch actuated by an advancing punched card, and a solenoid connected in series with said card sensing switch through said gated rectifier across said current source.

7. The apparatus of claim 1, including means for applying a cut off bias to said rectifier gate, said triggering signal being sufficient to overcome said bias and fire said rectifier.

8. The apparatus of claim 1, including a plurality of said hole detecting photosensitive elements arranged in alignment, a group of a plurality of said switches, a plurality of sets of said diodes, each of said diode sets corresponding in number to that of said hole detecting photosensitive elements, a selector switch connected in series with each of said diodes, said diode and selector switch pairs of a set thereof being connected in series with one of said switch means, said switches being successively actuated in synchronism with the advance of said punched card.

References Cited

UNITED STATES PATENTS

| | | | |
|---|---|---|---|
| 2,387,952 | 10/1945 | Smith | 209—111.7 |
| 3,022,891 | 2/1962 | Efram et al. | 209—111.7 |
| 3,033,448 | 5/1962 | Quinn | 209—111.7 X |
| 3,086,121 | 4/1963 | Cockrell | 209—111.7 X |
| 3,087,612 | 4/1963 | Duncan et al. | 209—111.7 X |
| 3,300,045 | 1/1967 | Beltz | 209—111.7 |
| 2,490,348 | 12/1949 | Ghertman | 235—61.63 X |
| 2,613,287 | 10/1952 | Geiger | 235—61.63 X |
| 3,131,316 | 4/1964 | Glaz | 235—61.115 X |
| 3,209,209 | 9/1965 | Mueller | 317—101 |
| 3,317,712 | 5/1967 | Silverman | 235—61.115 |
| 3,365,568 | 1/1968 | German | 235—61.115 |

DARYL W. COOK, Primary Examiner

R. M. KILGORE, Assistant Examiner

U.S. Cl. X.R.

209—111.7